(12) United States Patent
Zrimsek et al.

(10) Patent No.: US 11,293,802 B2
(45) Date of Patent: Apr. 5, 2022

(54) SYSTEM AND METHOD FOR SPECTRAL LIBRARY TRAINING

(71) Applicant: CHEMIMAGE CORPORATION, Pittsburgh, PA (US)

(72) Inventors: Alyssa Zrimsek, Pittsburgh, PA (US); Heather Gomer, Sewickley, PA (US); Shawna Tazik, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 0 days.

(21) Appl. No.: 17/127,464

(22) Filed: Dec. 18, 2020

(65) Prior Publication Data
US 2021/0190586 A1 Jun. 24, 2021

Related U.S. Application Data

(60) Provisional application No. 62/951,507, filed on Dec. 20, 2019.

(51) Int. Cl.
*G01J 3/02* (2006.01)
*G01J 3/457* (2006.01)
*G01J 3/447* (2006.01)

(52) U.S. Cl.
CPC ........... *G01J 3/0224* (2013.01); *G01J 3/0218* (2013.01); *G01J 3/0227* (2013.01); *G01J 3/0245* (2013.01); *G01J 3/447* (2013.01); *G01J 3/457* (2013.01)

(58) Field of Classification Search
CPC .. G01J 3/02; G01J 3/447; G01J 3/457; G01N 2021/1765; G01N 2021/3133; G01N 2201/0627; G01N 21/255; G01N 2201/129
See application file for complete search history.

(56) References Cited

U.S. PATENT DOCUMENTS

| | | | |
|---|---|---|---|
| 2011/0178420 A1* | 7/2011 | Ridder | A61B 5/1455 600/532 |
| 2012/0271591 A1 | 10/2012 | Kamenev et al. | |
| 2014/0092288 A1 | 4/2014 | Hattery et al. | |
| 2014/0118555 A1 | 5/2014 | Hegg et al. | |
| 2018/0263475 A1 | 9/2018 | Treado et al. | |

* cited by examiner

*Primary Examiner* — Abdullahi Nur
(74) *Attorney, Agent, or Firm* — DLA Piper LLP

(57) ABSTRACT

Techniques, devices and methods for discriminating a target from a background material without optimizing directly on the target are provided. The devices and methods can generate pass bands of single or multiple wavelengths of variable shape and intensity, and can also select and control the shape of the pass band profiles to improve the detection of targets of interest.

16 Claims, No Drawings and the one or more of PLSDA, PCA, LDA, linear regression, logistic regression, ridge regression, lasso regression, elastic net regression, SVM, RVM, and LARS do not optimize directly on the sample, and the one or more of PLSDA, PCA, LDA, linear regression, logistic regression, ridge regression, lasso regression, elastic net regression, SVM, RVM, and LARS do not optimize directly on the background material.

SYSTEM AND METHOD FOR SPECTRAL LIBRARY TRAINING

CROSS-REFERENCE TO RELATED APPLICATIONS

This application claims the benefit of U.S. Provisional Patent Application No. 62/951,507 filed Dec. 20, 2019, the entirety of which is incorporated by reference herein.

BACKGROUND

Molecular chemical imaging (MCI) is a powerful technique that can detect the presence of targets by modulating photons that have interacted with a sample. The technique is especially useful when the illuminating photons are in the VIS-NIR and SWIR spectral ranges. Target discrimination from background materials is achieved when score images are generated. A score image is the mathematical manipulation of two (2) or more images, thus creating a region of contrast that corresponds to a target of interest. The two or more images are collected from a scene of interest.

The images used to generate scores are produced by collecting interacted photons of single wavelengths. The single wavelengths (i.e., single energy states) are selected to correspond to the components that are present in the sample. Different individual wavelength images can be collected from the sample corresponding to the different components. The resultant combination of these images generates a score image, where the areas of interest are highlighted, thereby allowing the target to be readily identified by the user from the background.

While useful, this approach has drawbacks. For example, the shape of the profiles of the interacted photons is limited by the physical properties of the filters (for example, liquid crystals, bandpass filters, and the like) that are used to filter the interacted photons, as well as the broadband illumination sources which are not modulated. Furthermore, this approach does not take advantage of the full spectral range of information which can be used for target discrimination. It is therefore desirable to design systems and methods that can not only generate pass bands of single or multiple wavelengths of variable shape and intensity, but also can select and control the shape of the pass band profiles to improve the detection of targets of interest.

SUMMARY

This is a summary of the invention briefly indicating the nature and substance of the invention. It is submitted with the understanding that it will not be used to interpret or limit the scope or meaning of the claims.

In one embodiment, there is a method of discriminating a target from a background material, the method comprising: obtaining a spectral matrix corresponding to a plurality of spectral wavelengths and intensities; generating at least one regression coefficient from the spectral matrix; modulating an illumination source by selecting at least one passband of photons corresponding to the at least one regression coefficient; directing at least one passband of photons to the target and to the background material to thereby generate first interacted photons corresponding to the target and second interacted photons corresponding to the background material; and generating a score image from the first interacted photons and the second interacted photons, the score image including contrast that identifies the target and the background material.

In another embodiment, generating at least one regression coefficient is by one or more of partial least squares discrimination analysis (PLSDA), principal component analysis (PCA), linear discriminant analysis (LDA), linear regression, logistic regression, ridge regression, lasso (least absolute shrinkage and selection operator) regression, elastic net regression, support vector machines (SVM), relevance vector machines (RVM), and least angle regression (LARS).

In another embodiment, the one or more of PLSDA, PCA, LDA, linear regression, logistic regression, ridge regression, lasso regression, elastic net regression, SVM, RVM, and LARS do not optimize directly on the sample, and the one or more of PLSDA, PCA, LDA, linear regression, logistic regression, ridge regression, lasso regression, elastic net regression, SVM, RVM, and LARS do not optimize directly on the background material.

In another embodiment, the modulating is achieved by tuning the illumination source.

In another embodiment, the spectral matrix is obtained from a spectral library.

In another embodiment, the spectral matrix is obtained from a spectrometer.

In another embodiment, the spectrometer is selected from the group consisting of a Fiber Array Spectral Translator (FAST), a single polarization spectrometer, a dual polarization spectrometer, and combinations thereof.

In another embodiment, the spectral matrix is obtained from at least one of a conformal filter (CF), multi-conjugate filter (MCF), acousto-optic tunable filter (AOTF), liquid crystal tunable filter (LCTF), or a multivariate optical element (MOE).

In one embodiment, there is a device for discriminating a target from a background material, the device comprising a processor and non-transitory computer readable medium that when executed, causes the processor to: obtain a spectral matrix corresponding to a plurality of spectral wavelengths and intensities; generate at least one regression coefficient from the spectral matrix; modulate an illumination source by selecting at least one passband of photons corresponding to the at least one regression coefficient; direct the at least one passband of photons to the target and to the background material to thereby generate first interacted photons corresponding to the target and second interacted photons corresponding to the background material; and generate a score image from the first interacted photons and the second interacted photons, the score image including contrast that identifies the target and the background material.

In another embodiment, the processor generates the at least one regression coefficient by one or more of partial least squares discrimination analysis (PLSDA), principal component analysis (PCA), linear discriminant analysis (LDA), linear regression, logistic regression, ridge regression, lasso (least absolute shrinkage and selection operator) regression, elastic net regression, support vector machines (SVM), relevance vector machines (RVM), and least angle regression (LARS).

In another embodiment, the one or more of PLSDA, PCA, LDA, linear regression, logistic regression, ridge regression, lasso regression, elastic net regression, SVM, RVM, and LARS do not optimize directly on the sample, and the one or more of PLSDA, PCA, LDA, linear regression, logistic regression, ridge regression, lasso regression, elastic net regression, SVM, RVM, and LARS do not optimize directly on the background material.

In another embodiment, the processor modulates the illumination source by tuning the illumination source.

In another embodiment, the processor obtains the spectral matrix from a spectral library.

In another embodiment, the processor obtains the spectral matrix from a spectrometer.

In another embodiment, the spectrometer is selected from the group consisting of a Fiber Array Spectral Translator (FAST), a single polarization spectrometer, a dual polarization spectrometer, and combinations thereof.

In another embodiment, the spectral matrix is obtained from at least one of a conformal filter (CF), multi-conjugate filter (MCF), acousto-optic tunable filter (AOTF), liquid crystal tunable filter (LCTF), or a multivariate optical element (MOE).

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, "target" means a single material of interest that is capable of being detected by spectral imaging. The composition of the target is not limited.

Illumination Source

The illumination source is any tunable illumination source that is useful in generating the tuned photons necessary for sample illumination while meeting other ancillary requirements, such as power consumption, emitted spectra, packaging, thermal output, and so forth. In some embodiments, the illumination source is a light emitting diode (LED), organic light emitting diode (OLED), electroluminescent device, fluorescent light, gas discharge lamp, metal halide lamp, xenon arc lamp, induction lamp, or any combination of these illumination sources. A tunable illumination source means that the photons that are generated by the illumination source can be selected to be within at least one desired wavelength range by inputs to the illumination source itself, without modification by any optical filters. In some embodiments, the illumination source generates monochromatic photons, which are photons that have a single wavelength. In some embodiments, the illumination source generates polychromatic photons, which are photons that have multiple wavelengths or a passband, which is a range of photon wavelengths. The selected wavelength of the tunable illumination source is not limited and can be any passband within the ultraviolet (UV), visible (VIS), near infrared (NIR), visible-near infrared (VIS-NIR), shortwave infrared (SWIR), extended shortwave infrared (eSWIR), near infrared-extended shortwave infrared (NIR-eSWIR), mid-wave infrared (MIR), and long-wave infrared (LWIR) ranges.

The above ranges of light correspond to wavelengths of about 180 nm to about 380 nm (UV), about 380 nm to about 720 nm (VIS), about 400 nm to about 1100 nm (VIS-NIR), about 850 nm to about 1800 nm (SWIR), about 1200 nm to about 2450 nm (eSWIR), about 720 nm to about 2500 nm (NIR-eSWIR), about 3000 nm to about 5000 nm (MIR), or about 8000 nm to about 14000 nm (LWIR). The above ranges may be used alone or in combination of any of the listed ranges. Such combinations include adjacent (contiguous) ranges, overlapping ranges, and ranges that do not overlap. The combination of ranges may be achieved by the inclusion of multiple illumination sources, by filtering illumination sources, or by the addition of at least one component, such as phosphors and/or quantum dots, that convert high energy emissions, such as UV or blue light, into lower energy light having longer wavelengths.

In some embodiments, the illumination source is a modulated illumination source. As used herein, a "modulated illumination source" means that the photons that are generated by the illumination source are selectable by desired spectral range(s) or intensity, and the selection is achieved by tuning the illumination source or by modifying the photons that are generate by external optical filter or other optical device. The light can be a single wavelength or contain multiple wavelengths with variable spectral shape. Such modulation of the illumination sources is not limited and is alternatively referred to as "illumination source modulation." In some embodiments, the illumination source is modulated only by controlling the brightness, or luminous flux, of the illumination source. For example, an illumination source may be operated at lower power in order to reduce the luminous flux of the illumination source, effectively dimming the illumination source at selected wavelengths of light or the full spectral range. Alternatively, the illumination source is modulated by positioning a neutral density filter between the illumination source and the sample to be analyzed, which reduces the luminous flux that reaches the sample.

In some embodiments, the illumination source is an array of illuminating elements, and each illuminating element emits a selected wavelength of light. In such embodiments, the luminous flux and/or emitted spectrum of the illuminating elements, either alone or in groupings of the illuminating elements, is adjusted and/or controlled. This alters the overall emitted wavelengths of light and the luminous flux of the wavelengths emitted by the illumination source. In still further embodiments, the illumination sources that are part of an array of illuminating elements can each be controlled or tuned, individually, or in groups.

When an illuminating element is included as part of an illumination array and an illumination source, the illuminating element must be capable of at least one of rapid response to control inputs, narrow light bandwidth, and the ability to quickly and predictably change the luminous flux that is emitted from the illuminating element. Examples of such useful illuminating elements that are suitable for inclusion within the illuminating array include light emitting diodes (LED), organic light emitting diodes (OLED), electroluminescent devices, fluorescent lights, gas discharge lamps, metal halide lamps, xenon arc lamps, induction lamps, or any combination of these illumination sources. The selected wavelength of each illuminating element is not limited and can be any passband or wavelength emitted by the photoelectric effect or photon excitation within the ultraviolet (UV), visible (VIS), near infrared (NIR), visible-near infrared (VIS-NIR), shortwave infrared (SWIR), extended shortwave infrared (eSWIR), near infrared-extended shortwave infrared (NIR-eSWIR), mid-wave infrared (MIR), and long-wave infrared (LWIR) ranges.

In some embodiments, illumination source modulation is achieved by positioning a filter in the optical path between the illumination source and the sample. The choice of filter is not limited. In some embodiments, the filter is a fixed filter such as a bandpass filter that transmits light selected wavelengths. Fixed filters include absorptive filters, interference filters, and dichroic filters. In some embodiments, the filter is a neutral density filter. The neutral density filter can have a fixed reduction in luminous flux, or it can be variable and thereby controlled. In some embodiments, the filter is a liquid crystal filter or a liquid crystal on silicon (LCoS) that can be controlled to alter the luminous flux in near real time or in real time. In some embodiments, the filter is a mechanical, electromechanical, or micro electro mechanical device that modulates the luminous flux. Examples of mechanical filters include rotating filter wheels with at least one fixed filter. Examples of electromechanical filters include fixed filters that are moved by one or more of electric motors, solenoids, and servomechanisms. Examples of micro electro mechanical devices include digital micromirror devices. Digital micromirror devices are available under the trade name DLP® from Texas Instruments Incorporated of Dallas, Tex.

One example of a tunable LED source includes 32 LED channels, each corresponding to a band of light, although other sources with other numbers of channels can be utilized. Each of the channels can have a setting that ranges from 0 (i.e., no light output) to 1 (i.e., maximum light output). The channels are tunable with a finite amount of precision between the setting range from 0 to 1. Each combination of the settings for the 32 channels comprises one of the plurality of tuning states for the tunable LED source that corresponds to a unique illumination spectrum. In one example, the setting for the 32 channels of the tunable LED source can be provided by the analyte analysis computing device, although in other examples, the settings may be set by a control unit associated with the tunable LED light source based on feedback from the analyte analysis computing device. In further examples, the control unit and the analyte analysis computing device may be a single device. In one example, one or more tuning states for the tunable LED source can be determined, using the exemplary methods described below, to determine an optimal discrimination between a target analyte and the background materials in an image obtained Although the illumination source modulation can be achieved by positioning the filter in the optical path between the illumination source and the sample, it is desired in some embodiments to omit altogether any filters or other related modifying optics from the optical path between the illumination source and the sample. Such embodiments rely exclusively on the illumination source for control and selection of the desired wavelengths of photons that are to be directed to the sample.

Target Discrimination

To better identify a target within a given field of view, the present disclosure details systems and methods that illuminate at least one target with at least one beam of photons having at least one wavelength or wavelength range. In contrast to related technologies where broadband photons are first generated by the illumination source, followed by being filtered, and then being directed to the target where the illumination photons interact with the target to thereby generate interacted photons, the present disclosure describes a different configuration. In the present disclosure, the illuminating photons are modulated by the illumination source itself, which results in a different spectral profile of the illuminating photons. In some embodiments, the illuminating photons are tuned but are not filtered before they reach the target and interact with the target. In other embodiments, the illuminating photons are tuned but are filtered before they reach and interact with the target.

An image sensor is positioned to collect interacted photons from the sample based on the illumination from the tunable LED source. In one example, the interacted photons are collected in real-time as the channels of the tunable LED source are adjusted to provide different tuning states for the tunable LED source. By way of example, the image sensor can include one or more imaging devices, such as a CCD detector, an InGaAs detector, a CMOS detector, an InSb detector, a MCT detector, or combinations thereof, although other types and/or numbers of image sensors may be employed. One or more optics, such as mirrors and/or lenses, may be utilized to direct the interacted photons onto the image sensor. The interacted photons comprise one or more of photons absorbed by the sample, photons reflected from the sample, photons scattered by the sample, or photons emitted by the sample.

The image sensor is configured to generate one or more data sets based on illumination of the sample. In one example, the image sensor generates a first data set and a second data set that are associated with a first tuning state of the tunable LED source and a second tuning state of the tunable LED source, respectively, although the image sensor may generate other numbers of data sets associated with various tuning states. In this example, each of the data sets are associated with an illumination spectrum based on the setting of the channels of the tunable LED source as described above.

In one or more embodiments, at least two spectra, one hypercube and/or at least one imaging data set are collected from the photons that interact with a sample by one or more of a spectrometer, a liquid crystal tunable filter (LCTF), a multi-conjugate filter (MCF), a conformal filter (CF), an acousto-optic tunable filter (AOTF), or a multivariate optical element (MOE) based imaging system and form a spectral matrix. A model is built and applied to the spectral matrix that was collected. Based on the application of the model, at least one regression coefficient is computed. The computed regression coefficient(s), when applied to at least two spectra, one hypercube and/or at least one imaging data set, increase the contrast, thereby discriminating the target from the background. Tuning states to distinguish between target and background can be determined from the positive and/or negative regression coefficients. Typically, negative regression coefficients correspond to the target and positive regression coefficients correspond to the background. The analyte analysis computing device in this example includes processor(s), a memory, and a communication interface, which are coupled together by a bus, although the analyte analysis computing device can include other types or numbers of elements in other configurations in other examples. By way of example, the analyte analysis computing device can include other electronics for image analysis such as analog to digital converters, etc.

In some embodiments, one or more spectra or hypercubes are not collected from a sample or from a background directly. Instead, a spectral matrix is formed of a plurality of spectra or hyperspectral wavelengths and intensities from reference materials related to or identical to the targets and backgrounds. In such embodiments, the spectral matrix can be part of a spectral library. Also, in such embodiments, the regression analysis is fitted to the spectral matrix that is made up of the plurality of hyperspectral wavelengths and intensities.

The regression analysis that is fitted to the spectral matrix is not limited, and includes any regression or classification method that generates a regression coefficient vector, or a vector of weights to modulate the features or variables. Examples of regression analysis include one or more of partial least squares discrimination analysis (PLSDA), principal component analysis (PCA), linear discriminant analysis (LDA), linear regression, logistic regression, ridge regression, lasso (least absolute shrinkage and selection operator) regression, elastic net regression, support vector machines (SVM), relevance vector machines (RVM), and least angle regression (LARS).

The processor(s) of the analyte analysis computing device may execute programmed instructions stored in the memory of the analyte analysis computing device for any number of the functions described and illustrated herein. The processor(s) of the analyte analysis computing device may include one or more central processing units (CPUs) or general purpose processors with one or more processing cores, for example, although other types of processor(s) can also be used.

The memory of the analyte analysis computing device stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives (SSDs), flash memory, and/or any other computer readable medium which is read from and written to by a magnetic, optical, or other reading and writing system that is coupled to the processor(s), can be used for the memory.

EXAMPLES

Example 1

Testing was performed to determine whether the regression coefficients from a PLSDA model built on spectral data could optimize illumination profiles. Each of the profiles determined from the model are created for the purpose of target discrimination. An experimental example was prepared where nerve tissue, representing the target, was placed on lard, representing the background. Additionally, dyed collagen was provided as the background of the sample to obscure the target and simulate body tissues. The sample was a porcine nerve on lard, and the dyed collagen was 1 mm thick.

In Example 1, illuminating photons were generated by a tunable LED system, the CCS-1000/1100 available from Labsphere, Inc. of North Sutton, N.H. The tunable LED system generates photons having a wavelength range of about 400 nm to about 1000 nm. The tunable LED system was coupled to an endoscope platform. The endoscope platform is configured to both direct illuminating photons to the target, as well as also collect the interacted photons by way of at least one lens.

Two separate systems, the VIS-NIR MCI-E G1.0 system and VIS-NIR fiber array spectral translator (FAST) system, were used to collect spectral data. The MCI-E G1.0 system is representative of an LCTF based imaging system and the FAST system is representative of a spectrometer based system. The spectral data collected by the MCI-E G1.0 system and the FAST system were thereafter analyzed with partial least squares discriminant analysis (PLS-DA) with two factors and L2 spectral normalization to create two PLS-DA models, respectively. Regression coefficients were obtained from both models, and the regression coefficients were used to create two illumination profiles per model. The two illumination profiles are denoted T1 and T2. The regression coefficients obtained from the above analysis that had values below zero were designated as corresponding to T2, and the regression coefficients obtained from the above analysis that had values above zero were designated as corresponding to T1. The absolute value of each was taken so that negative coefficients had a positive illumination profile. Thus, the profiles of coefficient versus wavelength were imported into the tunable LED system to produce the illumination profiles.

The T1 and T2 images of the sample were collected for both the MCI-E G1.0 and FAST PLS-DA models using the tunable LED system. The manipulation of the images was performed by way of the SCORE Formula I below:

$$\{(T1-T2)/(T1+T2)\times(T1/T2)\} \quad \text{(Formula I)}$$

As a result of manipulation of the data, contrast between the nerve and the backgrounds was achieved, even with the obscuring collagen. In Example 1, the sample at an 80 mm working distance (WD) resulted in a signal to noise ratio (SNR) of 6.1431 and AUROC of 0.996 using the FAST PLS-DA model and a signal to noise ratio of 4.119 and AUROC of 0.987 for the MCI-E G1.0 model. AUROC means "Area Under the Receiver Operating Characteristic Curve."

Example 2

A further test was performed using the same procedure of Example 1 using the FAST model. The sample position was changed, but the same 80 mm WD was selected. As a result, the SNR was 5.915 and the AUROC was 0.974.

Example 3

A further test was performed using the same procedure of Example 1 using the FAST model. The sample position was changed, but the same 80 mm WD was selected. As a result, the SNR was 4.901 and the AUROC was 0.998.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances, where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description or claims, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of discriminating a target from a background material, the method comprising:
    obtaining a spectral matrix corresponding to a plurality of spectral wavelengths and intensities;
    generating at least one regression coefficient from the spectral matrix;
    modulating an illumination source by selecting at least one passband of photons corresponding to the at least one regression coefficient;
    directing at least one passband of photons to the target and to the background material to thereby generate first interacted photons corresponding to the target and second interacted photons corresponding to the background material; and
    generating a score image from the first interacted photons and the second interacted photons, the score image including contrast that identifies the target and the background material.

2. The method of claim 1, wherein generating at least one regression coefficient is by one or more of partial least squares discrimination analysis (PLSDA), principal component analysis (PCA), linear discriminant analysis (LDA), linear regression, logistic regression, ridge regression, lasso (least absolute shrinkage and selection operator) regression, elastic net regression, support vector machines (SVM), relevance vector machines (RVM), and least angle regression (LARS).

3. The method of claim 2, wherein the one or more of PLSDA, PCA, LDA, linear regression, logistic regression, ridge regression, lasso regression, elastic net regression, SVM, RVM, and LARS do not optimize directly on the sample, and the one or more of PLSDA, PCA, LDA, linear regression, logistic regression, ridge regression, lasso regression, elastic net regression, SVM, RVM, and LARS do not optimize directly on the background material.

4. The method of claim 1, wherein the modulating is achieved by tuning the illumination source.

5. The method of claim 1, wherein the spectral matrix is obtained from a spectral library.

6. The method of claim 1, wherein the spectral matrix is obtained from a spectrometer.

7. The method of claim 6, wherein the spectrometer is selected from the group consisting of a Fiber Array Spectral Translator (FAST), a single polarization spectrometer, a dual polarization spectrometer, and combinations thereof.

8. The method of claim 1, wherein the spectral matrix is obtained from at least one of a conformal filter (CF), multi-conjugate filter (MCF), acousto-optic tunable filter (AOTF), liquid crystal tunable filter (LCTF), or a multivariate optical element (MOE).

9. A device for discriminating a target from a background material, the device comprising a processor and non-transitory computer readable medium that when executed, causes the processor to:
   obtain a spectral matrix corresponding to a plurality of spectral wavelengths and intensities;
   generate at least one regression coefficient from the spectral matrix;
   modulate an illumination source by selecting at least one passband of photons corresponding to the at least one regression coefficient;
   direct the at least one passband of photons to the target and to the background material to thereby generate first interacted photons corresponding to the target and second interacted photons corresponding to the background material; and
   generate a score image from the first interacted photons and the second interacted photons, the score image including contrast that identifies the target and the background material.

10. The device of claim 9, wherein the processor generates the at least one regression coefficient by one or more of partial least squares discrimination analysis (PLSDA), principal component analysis (PCA), linear discriminant analysis (LDA), linear regression, logistic regression, ridge regression, lasso (least absolute shrinkage and selection operator) regression, elastic net regression, support vector machines (SVM), relevance vector machines (RVM), and least angle regression (LARS).

11. The device of claim 10, wherein the one or more of PLSDA, PCA, LDA, linear regression, logistic regression, ridge regression, lasso regression, elastic net regression, SVM, RVM, and LARS do not optimize directly on the sample, and the one or more of PLSDA, PCA, LDA, linear regression, logistic regression, ridge regression, lasso regression, elastic net regression, SVM, RVM, and LARS do not optimize directly on the background material.

12. The device of claim 9, wherein the processor modulates the illumination source by tuning the illumination source.

13. The device of claim 9, wherein the processor obtains the spectral matrix from a spectral library.

14. The device of claim 9, wherein the processor obtains the spectral matrix from a spectrometer.

15. The device of claim 14, wherein the spectrometer is selected from the group consisting of a Fiber Array Spectral Translator (FAST), a single polarization spectrometer, a dual polarization spectrometer, and combinations thereof.

16. The device of claim 9, wherein the spectral matrix is obtained from at least one of a conformal filter (CF), multi-conjugate filter (MCF), acousto-optic tunable filter (AOTF), liquid crystal tunable filter (LCTF), or a multivariate optical element (MOE).

* * * * *